(12) United States Patent
Dudzinski et al.

(10) Patent No.: US 10,708,854 B2
(45) Date of Patent: Jul. 7, 2020

(54) APPARATUS AND METHOD FOR PROVIDING NETWORK CONFIGURABILITY IN A WIRELESS NETWORK

(71) Applicant: Airspan Networks Inc., Boca Raton, FL (US)

(72) Inventors: Krzysztof Dudzinski, Langley Slough (GB); Virendra Nath Nagar, Boca Raton, FL (US)

(73) Assignee: AIRSPAN NETWORKS INC., Boca Raton, FL (US)

( * ) Notice: Subject to any disclaimer, the term of this patent is extended or adjusted under 35 U.S.C. 154(b) by 0 days.

(21) Appl. No.: 15/782,035

(22) Filed: Oct. 12, 2017

(65) Prior Publication Data
US 2019/0116548 A1   Apr. 18, 2019

(51) Int. Cl.
*H04W 48/16* (2009.01)
*H04B 7/08* (2006.01)
(Continued)

(52) U.S. Cl.
CPC .......... *H04W 48/16* (2013.01); *H04B 7/0695* (2013.01); *H04B 7/088* (2013.01);
(Continued)

(58) Field of Classification Search
CPC ..... H04W 48/16; H04W 48/20; H04W 24/10; H04W 28/20; H04W 72/0453; H04W 72/085; H01Q 3/02
See application file for complete search history.

(56) References Cited

U.S. PATENT DOCUMENTS

| 6,075,988 A | 6/2000 | Anderson et al. |
| 9,325,398 B2 * | 4/2016 | Negus ..................... H04W 4/00 |

(Continued)

FOREIGN PATENT DOCUMENTS

| CN | 102056242 A | 5/2011 |
| CN | 104469891 A | 3/2015 |

(Continued)

OTHER PUBLICATIONS

PCT Search Report and Written Opinion from PCT/GB2018/052738 dated Dec. 3, 2018, 14 pages.
(Continued)

*Primary Examiner* — Kevin D Mew
(74) *Attorney, Agent, or Firm* — Haynes Beffel & Wolfeld LLP

(57) ABSTRACT

A node and method are described for providing more flexible access to a wireless network. The node has scanning circuitry for performing a scanning operation to detect one or more wireless backhaul nodes and a performance characteristic associated with each of the one or more wireless backhaul nodes. This scanning operation is performed for each of a plurality of antenna directions. Filter circuitry is also provided to store a reference to the one or more wireless backhaul nodes, a value of the performance characteristic associated with the one or more wireless backhaul nodes, and an antenna position during the scanning operation, which are stored in a candidate list on the basis of a condition. The node also comprises data processing circuitry to select a selected wireless backhaul node from the candidate list based on the performance characteristic.

23 Claims, 12 Drawing Sheets

(51) Int. Cl.
  *H04B 7/06* (2006.01)
  *H04W 24/10* (2009.01)
  *H04W 48/20* (2009.01)
  *H04W 72/04* (2009.01)
  *H04W 72/08* (2009.01)
  *H01Q 3/02* (2006.01)
  *H04W 28/20* (2009.01)

(52) U.S. Cl.
  CPC ........... *H04W 24/10* (2013.01); *H04W 48/20* (2013.01); *H04W 72/0453* (2013.01); *H04W 72/085* (2013.01); *H01Q 3/02* (2013.01); *H04W 28/20* (2013.01)

(56) References Cited

U.S. PATENT DOCUMENTS

| | | | |
|---|---|---|---|
| 10,051,497 B1* | 8/2018 | Parihar | H01Q 1/1257 |
| 10,070,325 B2* | 9/2018 | Logothetis | G01S 19/53 |
| 10,123,218 B1* | 11/2018 | Yang | H04W 16/28 |
| 2001/0020915 A1 | 9/2001 | Proctor | |
| 2003/0195017 A1 | 10/2003 | Chen et al. | |
| 2003/0228857 A1 | 12/2003 | Maeki | |
| 2005/0245275 A1 | 11/2005 | Byford et al. | |
| 2005/0277443 A1 | 12/2005 | Ozluturk | |
| 2007/0218910 A1 | 9/2007 | Hill et al. | |
| 2009/0239533 A1 | 9/2009 | Somasundaram et al. | |
| 2009/0264123 A1 | 10/2009 | Agashe et al. | |
| 2011/0081903 A1 | 4/2011 | Cai et al. | |
| 2011/0143673 A1 | 6/2011 | Landesman et al. | |
| 2012/0028627 A1 | 2/2012 | Hunzinger | |
| 2012/0218964 A1 | 8/2012 | Park et al. | |
| 2012/0264368 A1 | 10/2012 | Aminaka et al. | |
| 2013/0183971 A1 | 7/2013 | Tamaki et al. | |
| 2013/0208653 A1 | 8/2013 | Morioka et al. | |
| 2013/0260760 A1 | 10/2013 | Pan et al. | |
| 2014/0192704 A1* | 7/2014 | Yi | H04W 24/10 370/315 |
| 2014/0301371 A1 | 10/2014 | Maeda et al. | |
| 2014/0313914 A1* | 10/2014 | Ling | H04W 24/02 370/252 |
| 2015/0024757 A1 | 1/2015 | Bulakci et al. | |
| 2015/0043422 A1 | 2/2015 | Fujishiro et al. | |
| 2015/0063199 A1 | 3/2015 | Wang et al. | |
| 2015/0065136 A1 | 3/2015 | Lee et al. | |
| 2015/0131618 A1 | 5/2015 | Chen | |
| 2015/0319677 A1 | 11/2015 | Colban et al. | |
| 2015/0373611 A1 | 12/2015 | Liu et al. | |
| 2016/0380353 A1 | 12/2016 | Lysejko et al. | |
| 2016/0380354 A1* | 12/2016 | Bozier | H01Q 1/02 455/562.1 |
| 2016/0380355 A1* | 12/2016 | Lysejko | F16M 11/06 343/853 |
| 2016/0381570 A1* | 12/2016 | Lysejko | F16M 11/06 455/562.1 |
| 2016/0381574 A1 | 12/2016 | Dudzinski et al. | |
| 2016/0381590 A1* | 12/2016 | Lysejko | H04W 24/10 370/252 |
| 2016/0381591 A1* | 12/2016 | Lysejko | H04L 67/18 370/252 |
| 2017/0208574 A1 | 7/2017 | Ramakrishna et al. | |
| 2017/0208632 A1 | 7/2017 | Gunasekara et al. | |
| 2017/0215117 A1 | 7/2017 | Kwon et al. | |
| 2018/0020486 A1 | 1/2018 | Yano et al. | |
| 2018/0041605 A1 | 2/2018 | Zhang et al. | |
| 2018/0070250 A1 | 3/2018 | Venkataraman et al. | |
| 2018/0076877 A1 | 3/2018 | Liu et al. | |
| 2018/0352473 A1* | 12/2018 | Gunasekara | H04W 48/16 |
| 2018/0359788 A1 | 12/2018 | Abedini et al. | |
| 2019/0028343 A1* | 1/2019 | Putman | H04L 41/08 |

FOREIGN PATENT DOCUMENTS

| | | |
|---|---|---|
| EP | 2034786 A1 | 3/2009 |
| EP | 2698034 A1 | 2/2014 |
| WO | 2005125021 A2 | 12/2005 |
| WO | 2005125021 A3 | 8/2006 |
| WO | 2008007375 A2 | 1/2008 |
| WO | 2008007375 A3 | 7/2009 |
| WO | 2012140999 A1 | 10/2012 |
| WO | 2014106539 A1 | 7/2014 |
| WO | 2014126161 A1 | 8/2014 |

OTHER PUBLICATIONS

PCT Search Report and Written Opinion from PCT/GB2018/052740 dated Nov. 28, 2018, 18 pages.

U.S. Office Action in U.S. Appl. No. 15/802,804 dated Aug. 23, 2018, 16 pages.

U.S. Office Action in U.S. Appl. No. 15/802,804 dated May 8, 2019, 16 pages.

U.S. Final Office Action in U.S. Appl. No. 15/802,804 dated Jan. 29, 2019, 22 pages.

UK Combined Search and Exam Report from GB1815785.9, dated Mar. 22, 2019, 7 pages.

UK Combined Search and Exam Report from GB1815790.9 dated Mar. 22, 2019, 8 pages.

UK Combined Search and Exam Report from GB1815793.3 dated Mar. 12, 2019, 8 pages.

U.S. Office Action in U.S. Appl. No. 15/782,051 dated Mar. 8, 2019, 11 pages.

U.S. Final Office Action in U.S. Appl. No. 15/782,051 dated Jul. 29, 2019, 11 pages.

U.S Final Office Action in U.S. Appl. No. 15/802,804 dated Sep. 9, 2019, 20 pages.

U.S. Office Action in U.S. Appl. No. 15/782,051 dated Nov. 18, 2019, 11 pages.

\* cited by examiner

Scan List

| Band | PCI | Cell Identity | PLMN Identity | EARFCN | Rank Indicator | SINR | Logical Angle | Heading Angle | Spectral Efficiency |
|---|---|---|---|---|---|---|---|---|---|
| B41H | 78 | 11922178 | 318781440 | 40978 | 2 | 12.85 | 90 | 140 | 4.0 |
| B41H | 78 | 11922178 | 318781440 | 40978 | 2 | 6.42 | 120 | 174 | 1.7 |
| B41H | 78 | 11922178 | 318781440 | 40978 | 1 | 4.2 | 210 | 274 | 1.3 |
| B41H | 78 | 11922178 | 318781440 | 40978 | 1 | 3.42 | 180 | 242 | 1.1 |
| B41H | 78 | 11922178 | 318781440 | 40978 | 2 | 3.22 | 60 | 117 | 0.8 |
| B41H | 78 | 11922178 | 318781440 | 40978 | 1 | 1.8 | 150 | 213 | 0.8 |
| B41H | 78 | 11922178 | 318781440 | 40978 | 1 | 0.77 | 240 | 292 | 0.6 |
| B41H | 78 | 11922178 | 318781440 | 40978 | 1 | -1.33 | 330 | 39 | 0.5 |
| B41H | 78 | 11922178 | 318781440 | 40978 | 1 | -1.8 | 0 | 64 | 0.5 |
| B41H | 78 | 11922178 | 318781440 | 40978 | 1 | -2.32 | 30 | 97 | 0.4 |
| B41H | 78 | 11922178 | 318781440 | 40978 | 1 | -3.61 | 300 | 2 | 0.3 |
| B41H | 196 | 133811201 | 318781440 | 40978 | 1 | -4.24 | 270 | 318 | 0.2 |

FIG. 3

| CDCL PDCL Rank | Scan List Rank | Band | PCI | MCC | MNC | Cell Identity | ECGI | EARFCN | Rank Indicator | SINR | Logical Angle | Logical Heading Angle | Spectral Efficiency |
|---|---|---|---|---|---|---|---|---|---|---|---|---|---|
| -1 | 1 | B41H | 78 | 310 | 083 | 11922178 | 334266579151618 | 40978 | 2 | 12.85 | 90 | 140 | 4.0 |
| -1 | 2 | B41H | 78 | 310 | 083 | 11922178 | 334266579151618 | 40978 | 2 | 6.42 | 120 | 174 | 1.7 |
| -1 | 3 | B41H | 78 | 310 | 083 | 11922178 | 334266579151618 | 40978 | 1 | 4.2 | 210 | 274 | 1.3 |
| -1 | 4 | B41H | 78 | 310 | 083 | 11922178 | 334266579151618 | 40978 | 1 | 3.42 | 180 | 242 | 1.1 |
| -1 | 5 | B41H | 78 | 310 | 083 | 11922178 | 334266579151618 | 40978 | 2 | 3.22 | 60 | 117 | 0.8 |
| -1 | 6 | B41H | 78 | 310 | 083 | 11922178 | 334266579151618 | 40978 | 1 | 1.8 | 150 | 213 | 0.8 |
| -1 | 7 | B41H | 78 | 310 | 083 | 11922178 | 334266579151618 | 40978 | 1 | 0.77 | 240 | 292 | 0.6 |
| -1 | 8 | B41H | 78 | 310 | 083 | 11922178 | 334266579151618 | 40978 | 1 | -1.33 | 330 | 39 | 0.5 |
| -1 | 9 | B41H | 78 | 310 | 083 | 11922178 | 334266579151618 | 40978 | 1 | -1.8 | 0 | 64 | 0.5 |
| -1 | 10 | B41H | 78 | 310 | 083 | 11922178 | 334266579151618 | 40978 | 1 | -2.32 | 30 | 97 | 0.4 |
| -1 | 11 | B41H | 78 | 310 | 083 | 11922178 | 334266579151618 | 40978 | 1 | -3.61 | 300 | 2 | 0.3 |
| -1 | 12 | B41H | 196 | 310 | 083 | 133811201 | 334266701040641 | 40978 | 1 | -4.24 | 270 | 318 | 0.2 |

FIG. 4

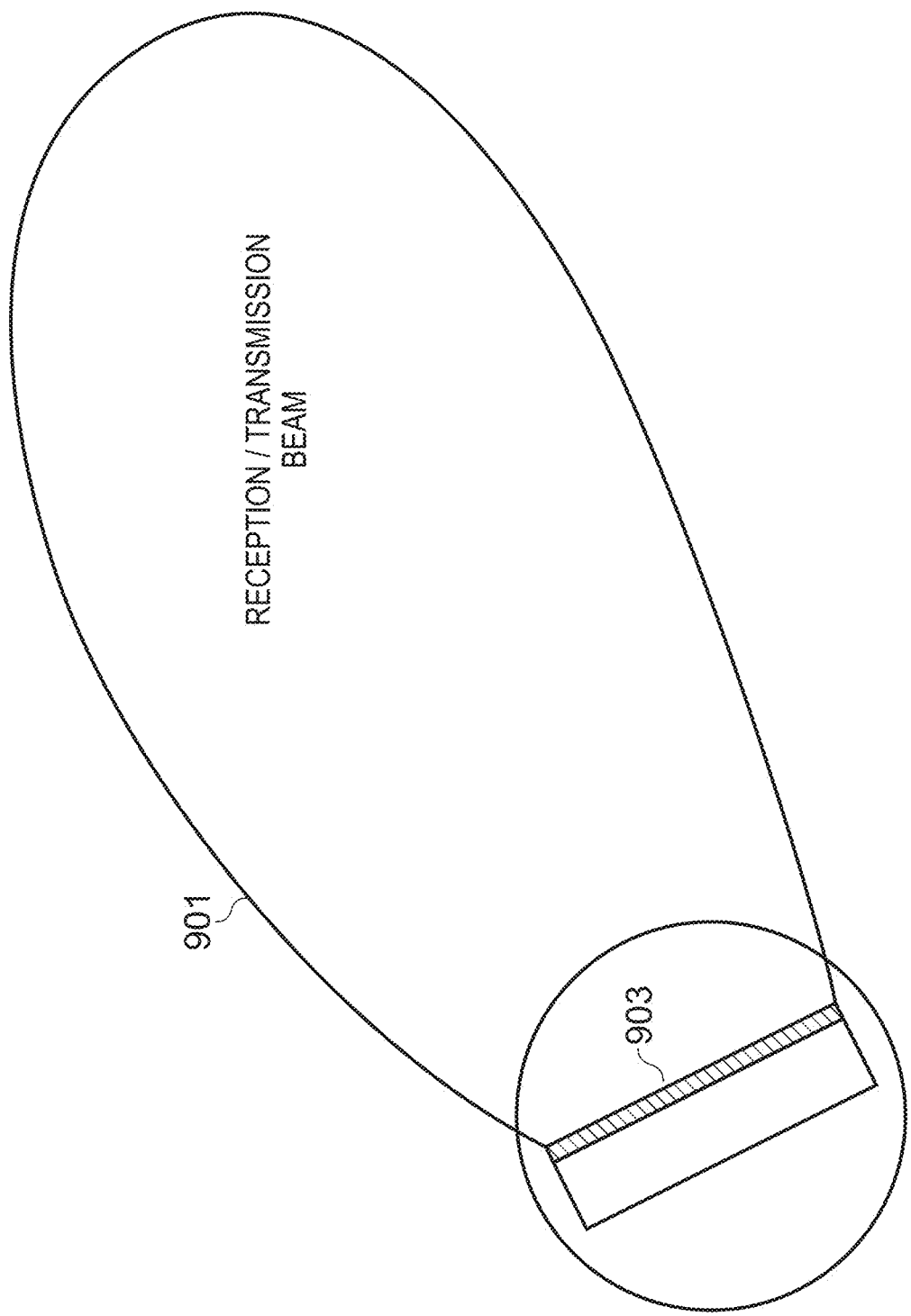

APPARATUS AND METHOD FOR PROVIDING NETWORK CONFIGURABILITY IN A WIRELESS NETWORK

BACKGROUND

The present technique relates to an apparatus and method for providing network configurability in a wireless network.

As more and more users embrace mobile technology, ever increasing demands are placed on mobile networks used to support mobile communication. These networks are required to not only support an ever increasing number of devices, but also as the functionality associated with such devices becomes ever more complex, so this has also increased the capacity requirements within the network.

Accordingly, there is a need for network operators to provide improved access to wireless networks in order to enable them to optimise use of bandwidth and improve network coverage. In particular, there is a need to improve the selection of a donor node to act as a wireless backhaul node to provide a backhaul connection for a wireless network.

The problems of providing sufficient network coverage and capacity can be particularly problematic in urban environments, where there is typically not only a high density of users, but where the urban infrastructure, such as large buildings, can significantly attenuate signals, and hence exacerbate the problem of seeking to provide sufficient network coverage and network capacity to service the users. Accordingly, it would be desirable to provide techniques that enabled the selection of a donor node to provide a backhaul link for a wireless node to be improved.

SUMMARY

In one example configuration, there is provided a node configured to operate in a wireless network, comprising: scan circuitry configured to perform, for each of a plurality of antenna positions, a scanning operation to detect one or more wireless backhaul nodes and a performance characteristic associated with each of the one or more wireless backhaul nodes; filter circuitry configured, in dependence on a condition, to store in a candidate list: a reference to one of the one or more wireless backhaul nodes, a value of the performance characteristic associated with the one of the one or more wireless backhaul nodes, and an antenna position during the scanning operation; and data processing circuitry configured to select a selected wireless backhaul node from the candidate list based on the performance characteristic.

In another example configuration, there is provided a method of operating a node in a wireless network, comprising the steps of: scanning, for each of a plurality of antenna positions, to detect one or more wireless backhaul nodes and a performance characteristic associated with each of the one or more wireless backhaul nodes; in dependence on a condition, storing in a candidate list: a reference to one of the one or more wireless backhaul nodes, a value of the performance characteristic associated with the one of the one or more wireless backhaul nodes, and an antenna position during the scanning operation; and selecting a selected wireless backhaul node from the candidate list based on the performance characteristic.

In a yet further example configuration, there is provided a node configured to operate in a wireless network, comprising: means for performing, for each of a plurality of antenna positions, a scanning operation to detect one or more wireless backhaul nodes and a performance characteristic associated with each of the one or more wireless backhaul nodes; means for storing, in dependence on a condition, in a candidate list: a reference to one of the one or more wireless backhaul nodes, a value of the performance characteristic associated with the one of the one or more wireless backhaul nodes, and an antenna position during the scanning operation; and means for selecting a selected wireless backhaul node from the candidate list based on the performance characteristic.

BRIEF DESCRIPTION OF THE DRAWINGS

The present technique will be described further, by way of example only, with reference to examples thereof as illustrated in the accompanying drawings, in which:

FIG. 3 illustrates a candidate list as determined by filter circuitry in accordance with one example;

FIG. 4 illustrates another candidate list as determined by the data processing circuitry in accordance with one example;

FIG. 9 illustrates a directional antenna having a directional reception and transmission beam.

DESCRIPTION OF EMBODIMENTS

Figure 1:
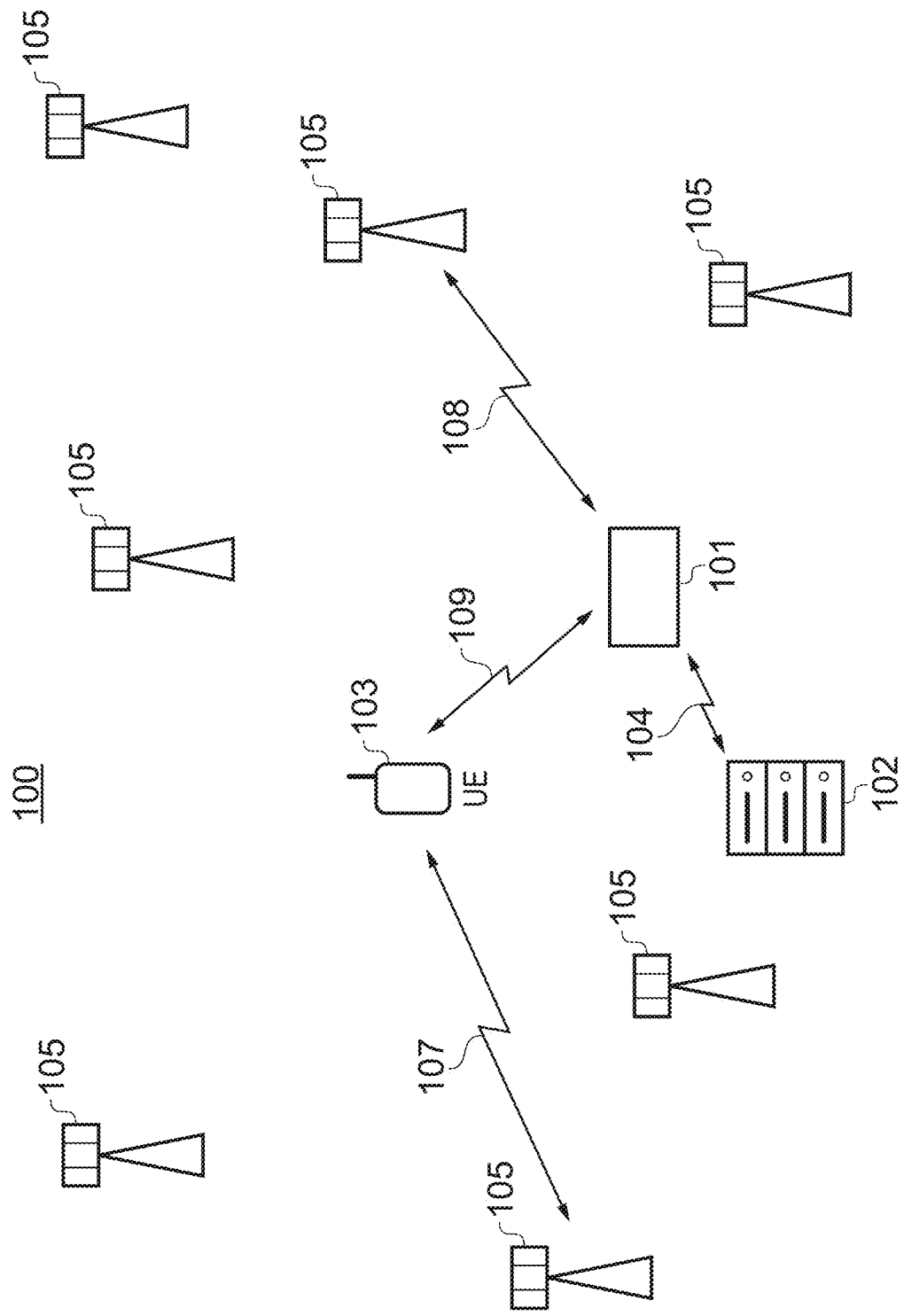
FIG. 1 is a system overview of a wireless network.

Before discussing the examples with reference to the accompanying figures, the following description of examples is provided.

In one example, there is provided a node configured to operate in a wireless network, comprising: scan circuitry configured to perform, for each of a plurality of antenna positions, a scanning operation to detect one or more wireless backhaul nodes and a performance characteristic associated with each of the one or more wireless backhaul nodes; filter circuitry configured, in dependence on a condition, to store in a candidate list: a reference to one of the one or more wireless backhaul nodes, a value of the performance characteristic associated with the one of the one or more wireless backhaul nodes, and an antenna position during the scanning operation; and data processing circuitry configured to select a selected wireless backhaul node from the candidate list based on the performance characteristic.

In a typical wireless network, there are a plurality of user equipment devices (UEs) which communicate within the wireless network via at least one wireless backhaul node. In some situations, particularly in a case in which signal quality is poor due to high levels of interference, the wireless network may comprise at least one user equipment relay node (UER) to relay a connection to the UEs from a wireless backhaul node. In some examples, the claimed wireless backhaul node is a donor node. Also, in some examples, the donor node is a donor eNodeB (DeNB). The wireless backhaul node is arranged in the wireless network to provide wireless connectivity to a UE enable the UE to have access to a backhaul network via the donor node.

Typical relay nodes in a wireless network will obtain a very limited choice of potential donor nodes. In particular an antenna used to perform a scanning operation may be in a fixed position which restricts the scope for utilising the directionality of the antenna in order to optimise selection of a donor node. By performing the scanning operation for each of a plurality of antenna positions, it is possible to achieve improved selection of a wireless backhaul node for a user equipment relay node (UER) in a wireless network. Since the scanning operation can be performed for each of a plurality of positions of the antenna, a candidate wireless backhaul node can be detected for each position. Therefore, when the data processing circuitry selects a wireless backhaul node from the candidate list, an increased number of options are present and thus the choice for donor selection is far less limited. The present technique enables a relay node to improve selection of a donor node by selecting a wireless backhaul node from a filtered list of candidate nodes (candidate wireless backhaul nodes or candidate donor node) on the basis of a performance characteristic associated with each candidate node rather than merely on the basis of a backhaul node selected according to a telecommunications standard, while still enabling that telecommunications standard (e.g. LTE) to be taken into consideration.

In accordance with the present technique, the filter circuitry stores a reference to each of the candidate wireless backhaul nodes detected during the scanning operation and for each candidate the antenna position from which that node was detected is stored. In addition, for each scanning operation, a performance characteristic is detected, e.g. the value of the performance characteristic is measured, the value corresponds to a single candidate wireless backhaul node and a single antenna position and for a single frequency band. Therefore, the node stores a list of all candidate wireless backhaul nodes detected for a range of antenna positions which each have a corresponding performance characteristic. This enables the data processing circuitry to select a best antenna position and a best wireless backhaul node based on the value of the performance characteristic stored in the candidate list which corresponds to that wireless backhaul node. Therefore, the present technique enables the selection of a wireless backhaul node for a UER to be extended beyond what would otherwise be a very limited choice.

Consequently, by extending the choice available to the UER device for wireless backhaul nodes available for relay, it becomes possible to optimise selection of a wireless backhaul node on the basis of a desired requirement. For example, a wireless backhaul node may be selected in order to improve use of bandwidth or to reduce interference.

In some examples, the apparatus described above may further comprise connection circuitry configured to receive configuration information from the selected wireless backhaul node, wherein the data processing circuitry is further configured to subsequently select a preferred wireless backhaul node from the candidate list based on the received configuration information.

By receiving configuration information from the EMS (Element Management System) while connected to the wireless backhaul node selected by the data processing apparatus, it is possible to provide further improvements in the choice of selection of a preferred wireless backhaul node. For example, the configuration information may specify at least one candidate node with a higher priority for selection as the wireless backhaul node than the selected candidate wireless backhaul node, for example by means of Preferred Donor Cell List (PDCL), where candidate wireless backhaul nodes are identified uniquely (e.g. by ECGI identifier). The wireless backhaul node within the PDCL will be treated as highest priority wireless backhaul node in the candidate list (CDCL) irrespective of other available candidate nodes.

The configuration information may further specify that a particular wireless backhaul node should be locked. A locked candidate node (e.g. node having locked EARFCN-E-UTRA Absolute Radio Frequency Channel Number and PCI-Physical Channel Identifier) may be identified in the configuration information, for example by a lock flag or a similar lock identifier, and specifies that the UER should not disconnect from the locked wireless backhaul node in favour of an alternative wireless backhaul node, even if the performance characteristic of a connection to the locked wireless backhaul node is poor.

In some examples, the scan circuitry is further configured to perform the scanning operation for each combination of the following plurality of factors: the plurality of antenna positions and at least one frequency band.

The present technique recognises that there may be more than one frequency band for which access has been granted by the operator to access wireless backhaul nodes. Therefore, the scanning operation is performed for each combination of the available (allowed) antenna positions and the available frequency bands. This further provides an additional choice to the UER for its selection of a wireless backhaul node. The candidate list may additionally store a reference to the frequency band when the scanning operation is performed.

In some examples, the plurality of factors also includes at least one sub-band.

A sub-band may be used, for example, to avoid a case in which the frequency of the connection between the wireless backhaul node and the UER is the same as the frequency of the connection between the UER and the UE. In particular, different sub-bands of a frequency band can be used to ensure that both connections use different frequencies which do not interfere. In addition, the use of a sub-band can be used to differentiate between a public network and a private (test) network. The operator can also select a subset of sub-bands to be available (allowed) sub-bands in order to reduce the limitations of access to wireless backhaul nodes operating in different frequency sub-bands in a mobile network.

In some examples of the present technique, the plurality of antenna positions is altered least frequently during successive iterations of the scanning operation.

For example, the alteration of the antenna position could occur less frequently than changing the frequency band. According to the present technique, the position of the antenna is altered in order to perform the scanning operation from a plurality of antenna positions, thereby granting the possibility of increasing the number of candidate wireless backhaul nodes which are detected. This example alters the current antenna position less frequency than any of the other factors referred to above, thereby reducing the amount of wear and tear to be suffered due to changing the position of the antenna. As a result, the reliability and longevity of the antenna can be reduced. For example, if the position of the antenna is altered by a motor, by altering the position less frequently it is possible to increase the longevity of the motor. Alternatively, if the position of the antenna is altered by a user, by altering its position less frequently than changing the frequency band the strain or inconvenience caused by the user, as well as the wear on the base of the container of the node will be reduced.

In some examples, at least one frequency band is altered least frequently during successive iterations of the scanning operation.

For example, the alteration of the frequency band could occur less frequently than changing the antenna position. By altering the position of the antenna more frequently than the frequency band, it may be possible to achieve a more efficient scanning operation. For example, the operator of a mobile network may have selected for a subset of available bands to have a high priority for use by a wireless backhaul node. In this case, it would be most efficient to perform the scanning operation in each of the plurality of antenna directions for a single frequency band. Therefore, it may be advantageous to the user to alter the frequency band least frequently out of all the factors mentioned above.

In some examples, the data processing circuitry subsequently selects in dependence on the result of an ordering operation performed on the candidate list; and the ordering operation is based on the received configuration information.

The inventors of the present technique realised that received configuration information of each detected candidate wireless backhaul node contains a significant amount of information which may be operable to alter the priority of each candidate. Therefore, by performing an ordering operation on the candidate list based on the received configuration information, it is possible to enable each candidate to be ranked according to its use priority and therefore to implement a more manageable list of candidate wireless backhaul nodes. As a result the preferred wireless backhaul node is subsequently selected more efficiently from among the managed list of candidate wireless backhaul nodes.

In some examples, the ordering operation is additionally based on the performance characteristic.

It is therefore possible to determine the order of the candidate list by considering the performance characteristic of the connection to each of the candidate nodes in addition to the received configuration information from the selected node. Thus the selection of the wireless backhaul node to be used by the UER can be improved.

In some examples, the selected wireless backhaul node is configured to operate as a donor node for the node in the wireless network.

A donor node enables a node to access, for example, a wireless backhaul.

In some examples, the performance characteristic is a link quality metric indicative of a quality of a link between the wireless backhaul node and the node.

When determining the selected wireless backhaul node the data processing circuitry uses the performance characteristic. By using a link quality metric as the performance characteristic, the selection of the selected wireless backhaul node can be determined based on a number of factors relating to the quality of the link. Thus the ability of the user to indicate a preferred wireless backhaul node to connect to based on a desired set of link quality metrics is improved.

In some examples, the link quality metric is determined based on at least one of: the frequency band of the wireless backhaul node, the signal to interference noise ratio and the spectral efficiency of the wireless backhaul node.

These metrics which are available for use as the link quality metric can be selected on the basis of a user preference, for example an operator preference. For example, if the primary object of the selection of a wireless backhaul node is the removal of the effects of interference, the operator may chose to use the signal to interference noise ratio (SINR) as the link quality metric. In addition, the link quality metric can be determined based on the RSRP (Reference Signal Received Power) of the wireless backhaul node of on DRM (donor ranking metric). Reference Signal Received Power (RSRP) is a stable metric of signal strength. RSRP Dominance is a stable metric of interference and indicates the potential of achieving a maximum CINR/SINR. In addition, DRM works by considering one or more independent metrics such as SINR, Spectral Efficiency (SE), and donor node RSRP dominance to provide a new metric for indicating the quality of a link.

In some examples, the node further comprises an antenna, wherein the antenna position comprises a rotation of the antenna.

By rotating the antenna between successive scanning operations it is possible to determine any available candidate wireless backhaul node in each direction, rather than only those which can be detected from a fixed antenna direction. In this example, the scanning operation is performed for each antenna rotation and a reference to the antenna rotation is stored in the storage circuitry of the node as the antenna position during the scanning operation. In this example, the rotation of the antenna is performed by a motor to physically rotate the antenna relative to a fixed reference point. However, in some examples, the rotation of the antenna may be an electronic rotation of the antenna beam, for example through beamforming.

In some examples, the node further comprises an antenna, wherein the antenna position comprises a location of the antenna.

By altering the location of the antenna between successive scanning operations it is possible to determine any available candidate wireless backhaul node from each of a plurality of locations of the antenna. In this example, the scanning operation is performed for each antenna location and a reference to the antenna location is stored in the storage circuitry of the node as the antenna position during the scanning operation. In some further examples, the antenna may be a directional antenna in which the transmission or reception beam of the antenna is non-uniform. In this case, the attenuation of a transmission signal or a reception signal will vary based on the angle of the directional antenna. This can improve the quality of the link between the wireless backhaul node and the node by minimising the attenuation of signals received from the direction of the directional antenna and by having a larger attenuation of signals arriving from sources of interference.

In some examples, the antenna is operable to be rotated through an angle of at least 360 degrees.

By providing a 360 degree angle of rotation the node is able to perform the scan operation in numerous azimuth angles, thereby improving the increase in available candidate nodes which can be detected during the successive scan operations.

In some examples, the configuration information specifies at least one connection criterion for at least one of the one or more wireless backhaul nodes, and the data processing circuitry is configured to subsequently select the preferred wireless backhaul node in dependence on the at least one connection criterion.

The at least connection criterion may include: a lock criterion associated with a locked candidate node (e.g. node having locked EARFCN-E-UTRA Absolute Radio Frequency Channel Number and PCI-Physical Channel Identifier) in the candidate list for specifying that the node should not attempt to form a connection with another candidate wireless backhaul node; an unlock criterion associated with an unlocked candidate node in the candidate list for specifying that the node should attempt to form a connection with another candidate node (for example, in the event that a connection is lost); and a priority connection which specifies a wireless backhaul node stored in the candidate list to be subsequently selected as the preferred wireless backhaul node. In addition, the at least one connection criterion may specify a plurality of priority wireless backhaul nodes stored in the candidate list, wherein a priority value is associated with each of the priority wireless backhaul nodes referred to by the at least one connection criterion. This enables the data processing circuitry to subsequently select a preferred wireless backhaul node from the candidate list based on the priority value of each of the priority backhaul nodes referred to by the at least one connection criterion specified in of the configuration information.

In some examples, the scan circuitry is configured to set an antenna position based on an antenna position stored in the candidate list.

For example, when the data processing circuitry has selected the selected wireless backhaul node from the candidate list, the antenna position of the node may be set to be the antenna position corresponding to the selected wireless backhaul node. In a case where the selected wireless backhaul node was detected for a plurality of antenna positions the antenna position corresponding to the best performance characteristic may be selected to be set as the antenna position. This enables the node to form a communication link with the selected wireless backhaul node and improves the quality of the communication link by setting the best antenna position for achieving the best link quality with the selected wireless backhaul node.

In some examples, the selected wireless backhaul node is the wireless backhaul node with a best value of the performance characteristic provided in the candidate list.

For example, if the performance characteristic is the received SINR, the higher the value of the SINR the better the quality of the link on the basis of that metric. In addition, a number of other metrics may be used to determine the performance characteristic, such as spectral efficiency (SE), a reference signal received power (RSRP), or other performance indicator. By selecting the wireless backhaul node with the best value of the performance characteristic, it is possible to improve the selection of the selected wireless backhaul node to maximise the quality of a link to the backhaul network. It will be appreciated that in this example, the node with a best value of the performance characteristic could be selected for an initial connection and an alternative node could be selected at a later point.

In some examples, the data processing circuitry is further configured to selectively restrict access to the one or more wireless backhaul nodes based on restriction information contained within the configuration information.

There are situations in which the operator of a mobile network may wish to selectively restrict access to a subset of the available wireless backhaul nodes or to selectively restrict access to a subset of the available frequency bands or frequency sub-bands.

In some examples, the restriction information specifies a subset of wireless backhaul links which do have restricted access.

The restriction information may thereby specify restrictions in respect of the wireless backhaul nodes, frequency bands or frequency sub-bands, which are allowed to be accessed by the node. It will be appreciated that the restriction information is not limited to specifying restricted access according to these criteria. This allows the operator to control access to wireless backhaul nodes in order to allocate bandwidth more efficiently, to reduce the effects of interference or to improve the security of a mobile network or sub-network. In some examples, the condition is determined by the 3GPP standard and is used to determine which of the one or more wireless backhaul nodes are suitable for connection as donor nodes. As mentioned above, a number of telecommunications Standards including LTE are used during wireless communication, in particular in mobile networks. The filter circuitry according to the present technique is arranged to store a reference to a detected wireless backhaul node in dependence on a condition, and this condition in some examples may be determined by a LTE 3GPP Standard. This enables a manufacturer of an example of the present technique to install a standard microprocessor with the filter circuitry already present and therefore reduces manufacturing costs and the complexity of the design.

In some examples, the configuration information is a preferred donor cell list.

The preferred donor cell list (PDCL) is a prioritised list of candidates, (in which candidate wireless backhaul nodes are identified uniquely (e.g. by ECGI identifier for DeNB)), ranked according to characteristics such as: air interface capacity, available backhaul capacity, available delay capacity and network load balancing.

Particular embodiments will now be described with reference to the Figures.

FIG. 1 schematically illustrates a wireless network 100 in which there is arranged a plurality of DeNBs 105, a user equipment device (UE) 103 and a node 101 as used in the above described examples. Herein, the User Equipment Relay (UER) 101 is an example of the claimed node and the DeNB 105 is an example of the claimed wireless backhaul node. In the wireless network 100 illustrated, the UE 103 is operable to connect to a DeNB 105 directly, or to connect to the UER 101 according to the present technique, to receive access to a backhaul network. For example, in an urban environment there may be a large number of tall buildings which obscure the view of the UE 103 from accessing the DeNB 105. Alternatively, in a rural environment, the DeNB 105 may be located a large distance from the UE 103 and therefore the received signal strength from the DeNB 105 may be insufficient to form a suitable connection. In this case, a UER 101 is operable to perform the functionality of the present technique. In this case, the UER performs successive scanning operations in each of a plurality of antenna positions in order to detect at least one DeNB 105 within range of the UER 101 and stores a reference to each detected DeNB 105 in a candidate list along with the antenna position and performance characteristic which correspond to the detected DeNB 105.

According to some examples, an Element Management Server (EMS) 102 may be used to store a centralised list of scan measurements of the scanning operation which may be reported by the node 101 to the EMS after the successive scanning operations are complete. The configuration may also thereby be supplied by the EMS. According to this example, the UER 101 is operable to receive a prioritised candidate list (donor selection list), which may also be referred to as a prioritised donor cell list (PDCL), which is prioritised based on air interface capacity, available backhaul capacity, available delay capacity and network load balancing. The UER will then autonomously re-select the most suitable donor 105 based on the PDCL and provide backhaul services to the connected DeNB 105.

Figure 2:
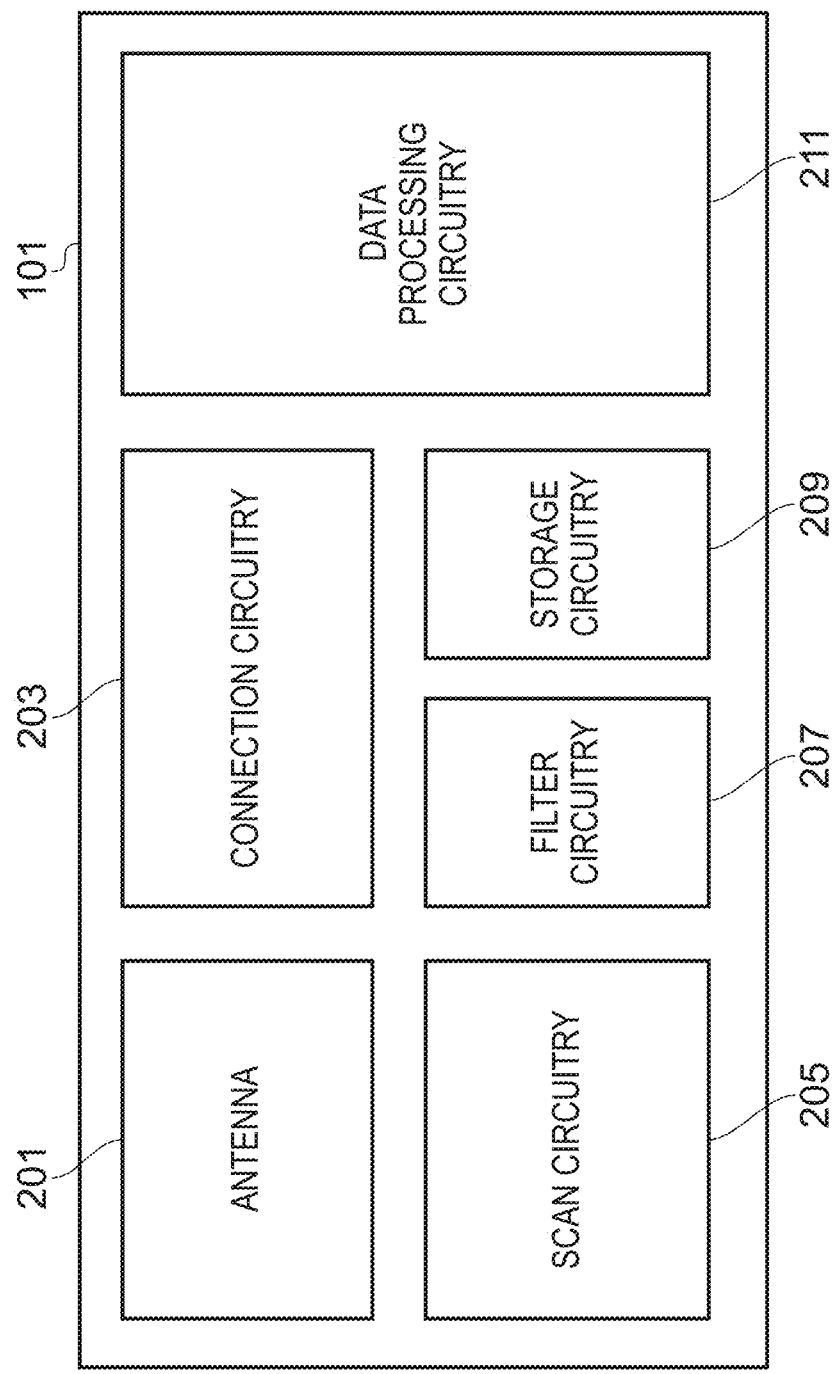
FIG. 2 is a block diagram illustrating the functionality provided within a node 101 of FIG. 1 in accordance with one example.

FIG. 2 schematically illustrates a node as used in the described examples. Herein, the node (cellular relay node) will also be referred to as a user equipment relay (UER). As shown, the node 100 comprises scan circuitry 205 which is configured within the node 101 to perform a scanning operation to detect one or more DeNBs 105 and a performance characteristic. The scan circuitry uses the antenna 201 to perform the scanning operation and the antenna 201 is configured to be movable into a plurality of positions to enable the scan circuitry 205 to perform the scanning operation in a plurality of antenna positions. Antenna positions will be described later in respect of FIGS. 7, 8 and 9. The scanning operation may be performed for all available operator defined bands and detects a performance characteristic associated with each of the one or more DeNBs. This performance characteristic may, for example, be a signal to interference noise ratio (SINR), spectral efficiency (SE), a reference signal received power (RSRP) or other performance indicator.

Filter circuitry 207 is also provided by the node 100 which is arranged within the node 100 to store references to each of the detected DeNB nodes (candidate donor nodes) in a candidate list stored in the storage circuitry 209. The filter circuitry may also be configured to store in the candidate list, for each visible donor candidate node: the frequency band being used by the UER during the scanning operation, PCI (Physical Cell Identity), PLMN (Public Land Mobile Network), a cell identifier, EARFCN (EUTRA Absolute Radio-Frequency Channel Number), rank indicator, SINR (Signal-to-Interference-plus Noise Ratio), the antenna direction used by the node during the scanning operation, spectral efficiency and TAC (Tracking Area Code). The data processing circuitry 211 of the node 100 then selects the best candidate donor node from the candidate list in order to complete the plug-and-play (PnP) functionality of the UER 101.

The node 101 also comprises connection circuitry 203 which is operable to receive configuration information from the candidate donor node selected by the data processing circuitry 211. This configuration information may specify a candidate donor node to be used as the donor node. Alternatively the configuration information may list a plurality of donor nodes with corresponding priority information to be used to update an order of the candidate nodes in the candidate list. In response to receiving the configuration information, the data processing circuitry may subsequently select, from the candidate list, a preferred wireless backhaul node to be used as the donor node.

FIG. 3 illustrates an example candidate list 303. According to this example, the candidate list may include an indication of the band, PCI, the identity of the cell (reference to the wireless backhaul node), the PLMN identity, EARFCN, a rank indicator, SINR, both a logical angle and a heading angle of the antenna and the SE.

As illustrated in FIG. 3, the first entry of the candidate list (scan list) illustrates a single candidate donor node detected by the UER. In the case of the first detected candidate node, it was detected on band B41H with a PCI value of 78. The entry additionally records an SINR value (in this example, this is the performance characteristic) of 12.85 and an SE value of 4.0. The candidate node is recorded to have been detected at a logical angle of 90 (angle relative to a local reference point) and a corresponding heading angle of 140 (angle relative to a remote reference point, such as due North).

In the second entry, it can be seen that the logical angle is altered to 120 and the heading angle to 174. Accordingly, for the same candidate node, indicated by the same cell identity, the SINR and SE values differ from the previous entry. This may, for example, be done by rotating the directional antenna 801 or by using beamforming. Alternatively, it could be done by physically placing the UER in an alternative location.

It will be appreciated that in some situations the band of a detected candidate node will differ. For example the band of a detected candidate node may be B25 or B41L. In some instances a single candidate node may be detected on a plurality of channels. In this example, it is clear that the device is doing a single rotation (e.g. considering all angles) for a single band. In the case that no candidate donor nodes were found, the process would then be repeated for a different band. In other examples, all bands may be searched for a single antenna position (e.g. location) before moving on to the next position.

FIG. 4 illustrates an example of the modified candidate list 307. According to this example, the candidate list may include the PDCL (Preferred DeNB Cell List) rank, the scan list rank, an indication of the band, PCI, MCC (Mobile Country Code), MNC (Mobile Network Code), the identity of the cell (reference to the wireless backhaul node), ECGI (E-UTRAN Cell Global Identifier), the PLMN identity, EARFCN, a rank indicator, SINR, both a logical angle and a heading angle of the antenna and the SE (Spectral Efficiency). As illustrated, a scan list rank is allocated to each entry of the candidate list. This scan list rank may be used, for example, when selecting a preferred DeNB from the candidate list based on the received configuration information. The scan list rank may be generated based on, any of the band, SINR, and SE (among others) and may be used to determine the priority of use of one candidate node over another.

Figure 5:
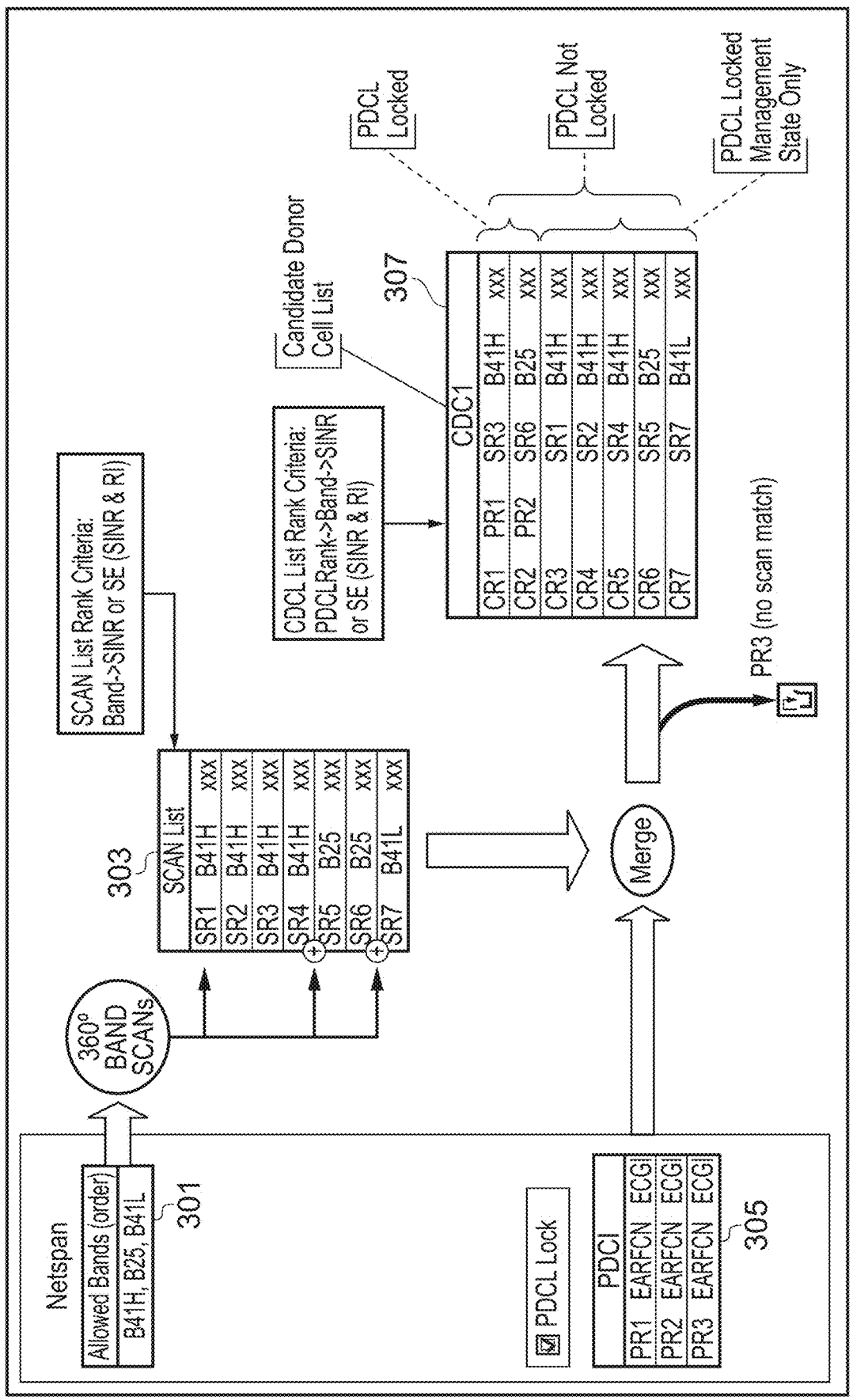
FIG. 5 illustrates the scanning operation and subsequent ordering of a candidate list in accordance with one example.

FIG. 5 illustrates an example of the present technique by showing the candidate list (scan list) 303 being used by the data processing circuitry to subsequently select a DeNB from a modified candidate list (CDCL) 307 after the connection circuitry 203 has received configuration information (PDCL) 305 from the selected DeNB. As described above with reference to FIG. 2, the scan circuitry 205 performs successive scanning operations for each of a plurality of antenna positions. In one example, the scanning operation is performed for each of a plurality of allowed frequency bands 301 in each of the plurality of antenna positions, resulting in the candidate list 303.

As shown in FIG. 5, the candidate list 303 includes a reference to the candidate donor node, the frequency band used at the time of detection and a performance characteristic (scan list rank criteria). For example, the first four entries in the candidate list (scan list) 303 correspond to candidate donor nodes in the B41H frequency band, the following two candidate donor nodes are detected on the B25 frequency band and the final candidate donor node is detected on the B41L donor node. Again, in some examples, the device scans each frequency band for a given antenna position before moving to a next antenna position. In some examples, only the top priority band is scanned for a given antenna position, and if no candidate node is found in that band then only the next highest priority band it scanned. The candidate donor nodes in the candidate list 303 are detected at a plurality of antenna directions and each have an associated performance characteristic (SINR, SE etc). The rank priority of the candidate nodes in the candidate list 303 is designated by the identifier in the first column of the candidate list 303. For example, SR1 indicates a scan rank of 1, SR2 indicates a scan rank of 2, and so on. In this example, the scan rank indicates a candidate donor node which is preferred for selection based on its performance characteristic. In some examples, the device scans each antenna position for a given frequency band before moving to a next frequency band.

In some examples, upon reception of the configuration information 305 from the selected DeNB or from the EMS, the candidate list 303 is merged with the configuration information to produce a modified candidate list. The modified candidate list may also be referred to as the candidate donor cell list (CDCL) and may comprise an updated order based on the configuration information. In addition, the PDCL list may be indicated as being "locked". In particular, when received from the EMS, an accompanying flag "PDCL Locked" may also be received. When this flag is set (indicating a locked PDCL), the receiving node can provide wireless backhaul and be managed by the EMS only when connected to candidate donor nodes listed in the PDCL list. If a connection to a candidate donor node on the PDCL list is not possible, the node can connect to a donor not listed on the PDCL list, but may only connect for management purposes and not to provide wireless backhaul. This is indicated in FIG. 5 for the candidates shown as having "PDCL locked management state only". If the PDCL flag is not set (not locked), the node can deliver a full service (management and wireless backhaul) when connected to any candidate donor from the CDCL list. This is indicated in FIG. 5 for the candidates shown as having "PDCL not locked". In this case, the PDCL list is used only for ranking of the candidate donor nodes in the CDCL.

In some examples, the EMS may supply a list of allowed frequency bands and frequency sub-bands to the node 101 and may also apply a prioritisation to each band by specifying band prioritisation information corresponding to each of the plurality of frequency bands and frequency sub-bands. The band prioritisation information may thereby be used to apply a band priority to specify which of the frequency bands or sub-bands are to be preferentially used during the scanning operation.

Figure 6:
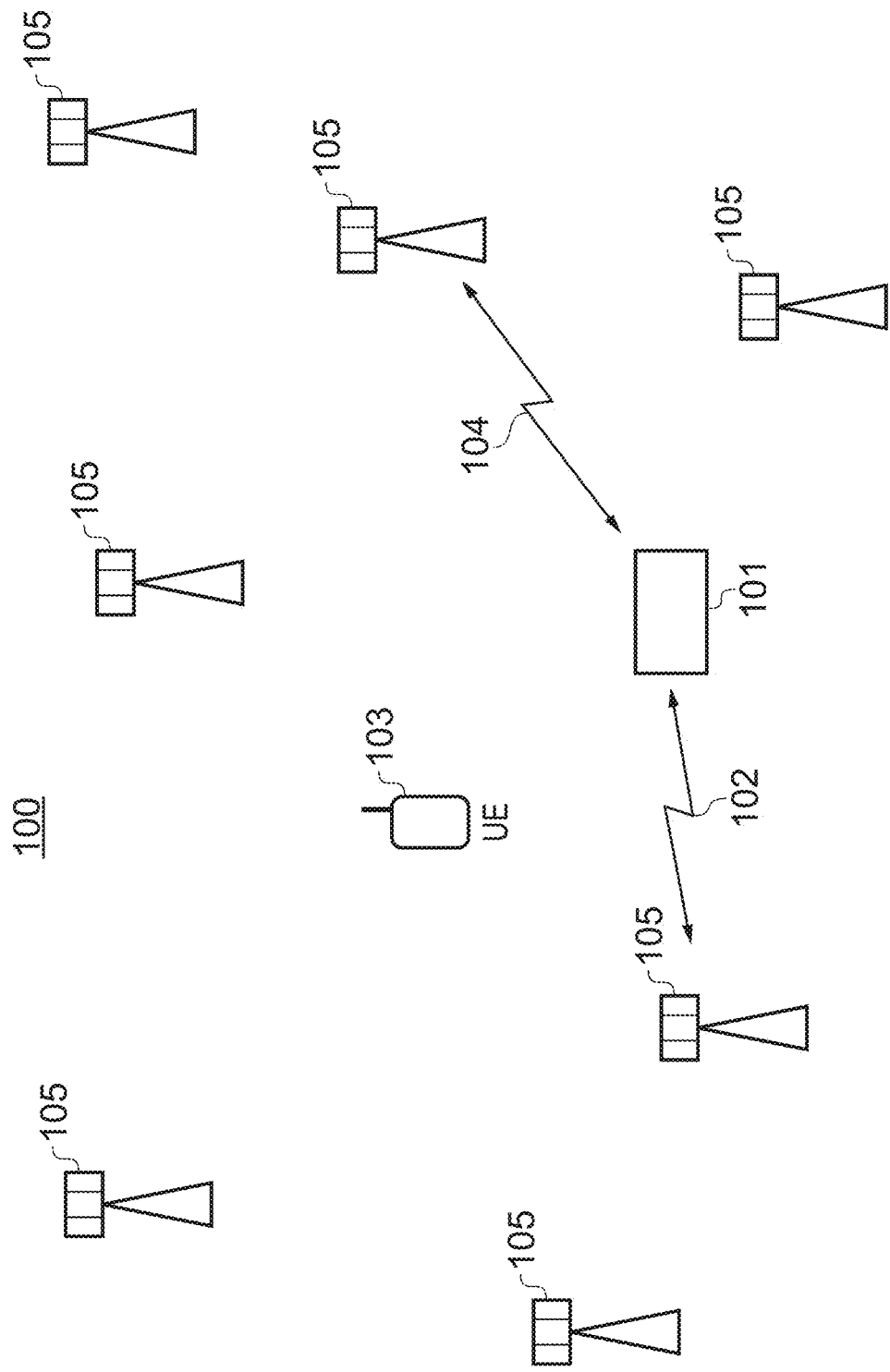
FIG. 6 is a system overview of the wireless network which illustrates a change in the selection of the wireless backhaul node to be the donor node for a node in accordance with one example.

FIG. 6 illustrates a wireless network 100 as described in FIG. 1 wherein the UER 101 establishes a connection with a selected DeNB 105 via a first communication link 102, the selected DeNB 105 being selected based on a corresponding performance characteristic detected during the scanning operation and stored in the storage circuitry 209 by the filter circuitry 207. Upon receiving configuration from the selected DeNB 105, the UER 101 is further arranged to subsequently select a preferred DeNB 105 from the candidate list based on the received configuration information. The UER 101 may then form a connection to the preferred DeNB 105 via a second communication link 104.

Figure 7:
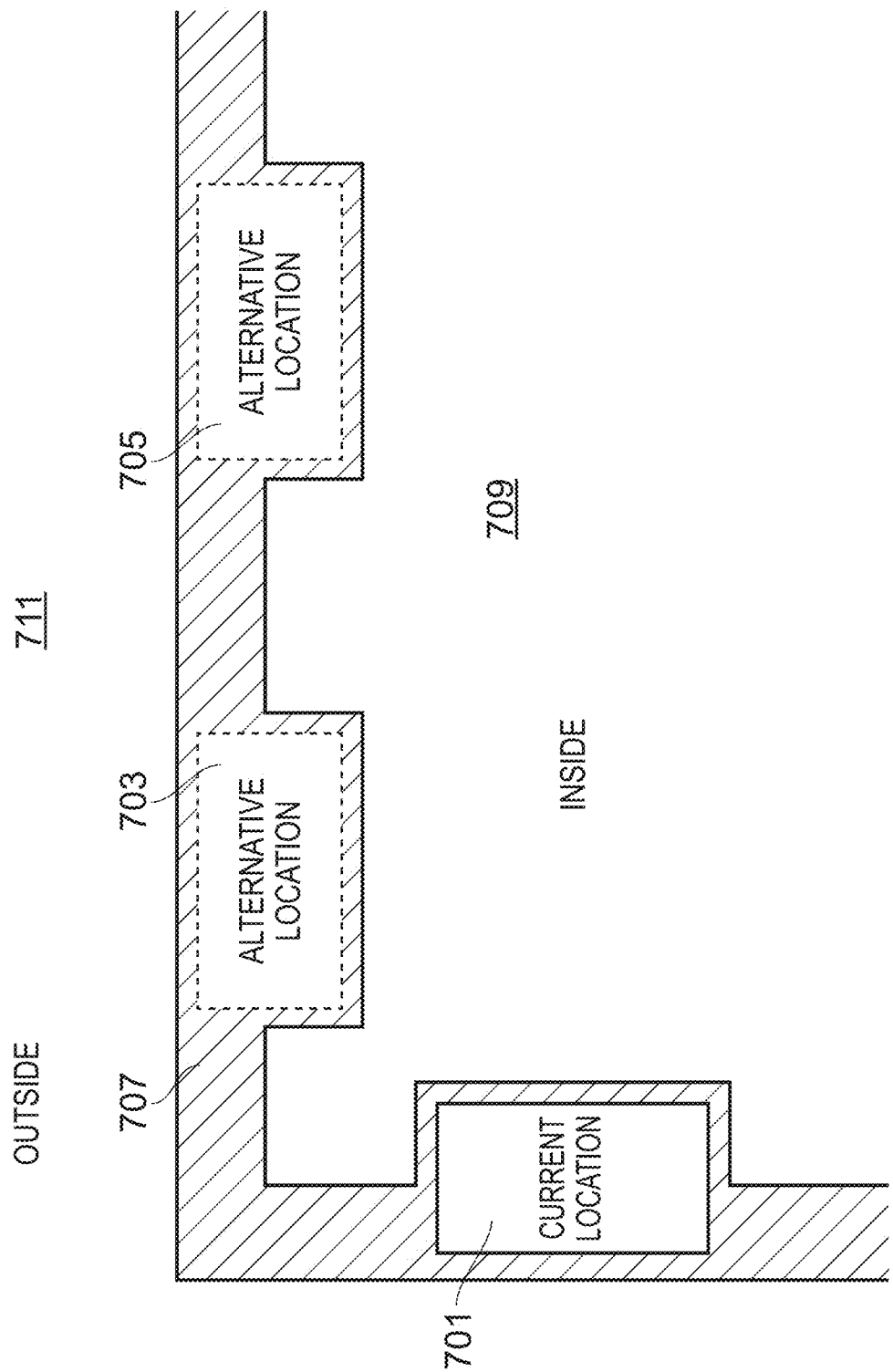
FIG. 7 illustrates how in accordance with one example an antenna position may be varied by moving the node between a plurality of locations.

FIG. 7 illustrates a plurality of positions of the antenna according to one example of the present technique. A wall 707 is illustrated which comprises a plurality of locations, which may be for example a plurality of window ledges, which are possible locations for the node 101 to be positioned. According to the present technique, the scanning circuitry is configured to perform a scanning operation for each of a plurality of antenna positions, which in this case is achieved by physically moving the node between the current location 701 and the alternative locations 703, 705. The scanning operation may be performed for an initial antenna position, for example the current location 701 which may be a location within a room. Alternatively, the positions may be locations corresponding to a plurality of fixed units, such as lampposts, rooftops, mantelpieces or similar fixed units. The scanning operation may be subsequently performed at each of a plurality of alternative locations 703 and 705 as shown in FIG. 7. This provides a plurality of locations from which DeNBs may be detected with a corresponding performance characteristic. The configurability of the wireless network is therefore improved, since the user is able to select a location of the UER based on a set of preferences.

Figure 8C:
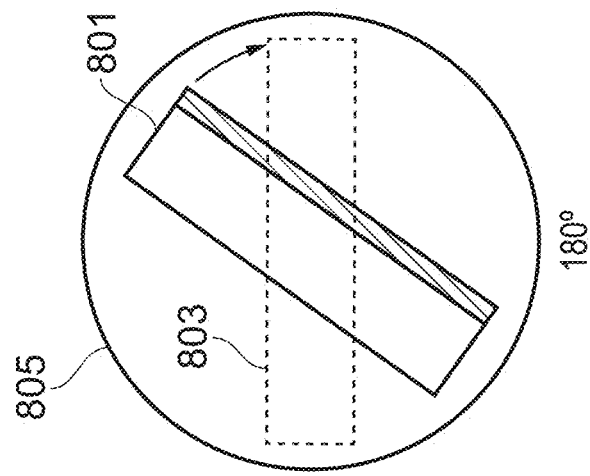
FIGS. 8A to 8F illustrate how in accordance with one example an antenna position may be varied by rotation.
Figure 8B:
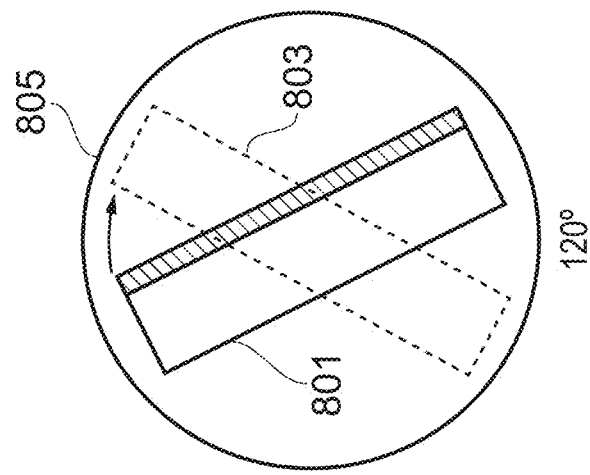
Figure 8A:
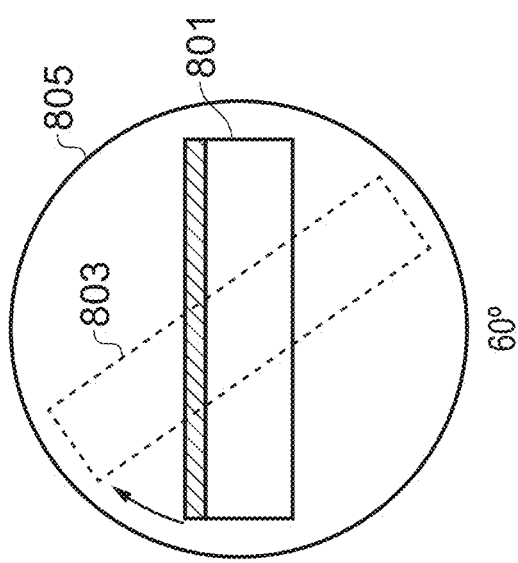
Figure 8F:
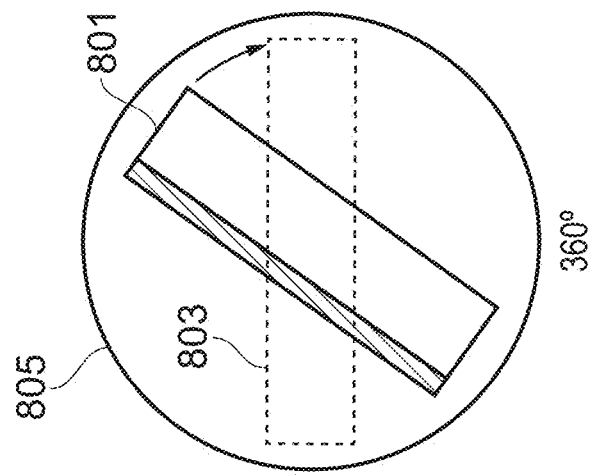
Figure 8E:
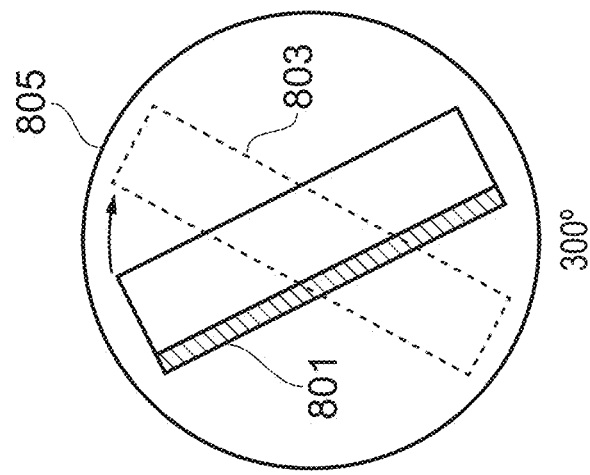
Figure 8D:
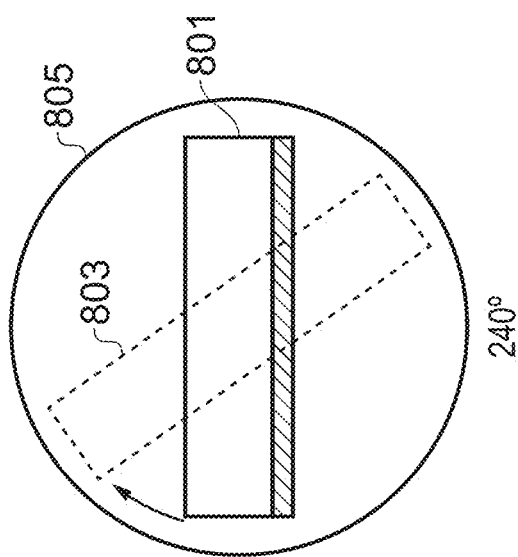

FIGS. 8A to 8E illustrate a plurality of positions of the antenna according to one example of the present technique. As shown in FIG. 8A, a node 805 is comprised of at least an antenna 801. According to the present technique, the scanning circuitry is configured to perform a scanning operation for each of a plurality of antenna positions, which may be, for example, a plurality of antenna rotations represented by a rotation angle. The antenna of FIG. 8A is shown as being rotated from 0 degrees to 60 degrees in one step. The antenna of FIG. 8B is shown as being rotated from 60 degrees to 120 degrees in one step. FIGS. 8C, 8D, 8E and 8F show corresponding rotations of the directional antenna. In this manner, it is possible to rotate the antenna a pre-defined number of degrees between each successive performance of the scanning operation. It will be appreciated that the angle between each rotation is not limited to 60 degrees and may indeed be any interval. In addition, the rotation may be continuous rather than being performed on the basis of a discrete number of fixed rotations. Accordingly, the antenna may be a steerable antenna providing a steering mechanism by which the antenna may be rotated. Alternatively, an antenna rotation may be an electronic rotation by beamforming (beam steering), removing the need to physically rotate the antenna. By rotating the antenna in each of a plurality of antenna directions, in examples of the present technique it is possible to determine a preferred antenna direction for communication with a candidate donor node, based on the quality of a link to the candidate donor node.

FIG. 9 illustrates a directional antenna 903 of a node 101, which has at least one of a reception beam 901 and a transmission beam 901 that is directional. According to this example, the directional antenna 903 has a non-uniform beam 901 whereby the attenuation of signals received by the directional antenna is non-uniform on for each angle in the azimuth plane. By providing the node of the present technique with a directional antenna 903 it becomes possible to more easily detect the presence of a signal from a desired source, such as a donor node, while simultaneously attenuating a signal from an interference source in a different rotational direction.

Figure 10:
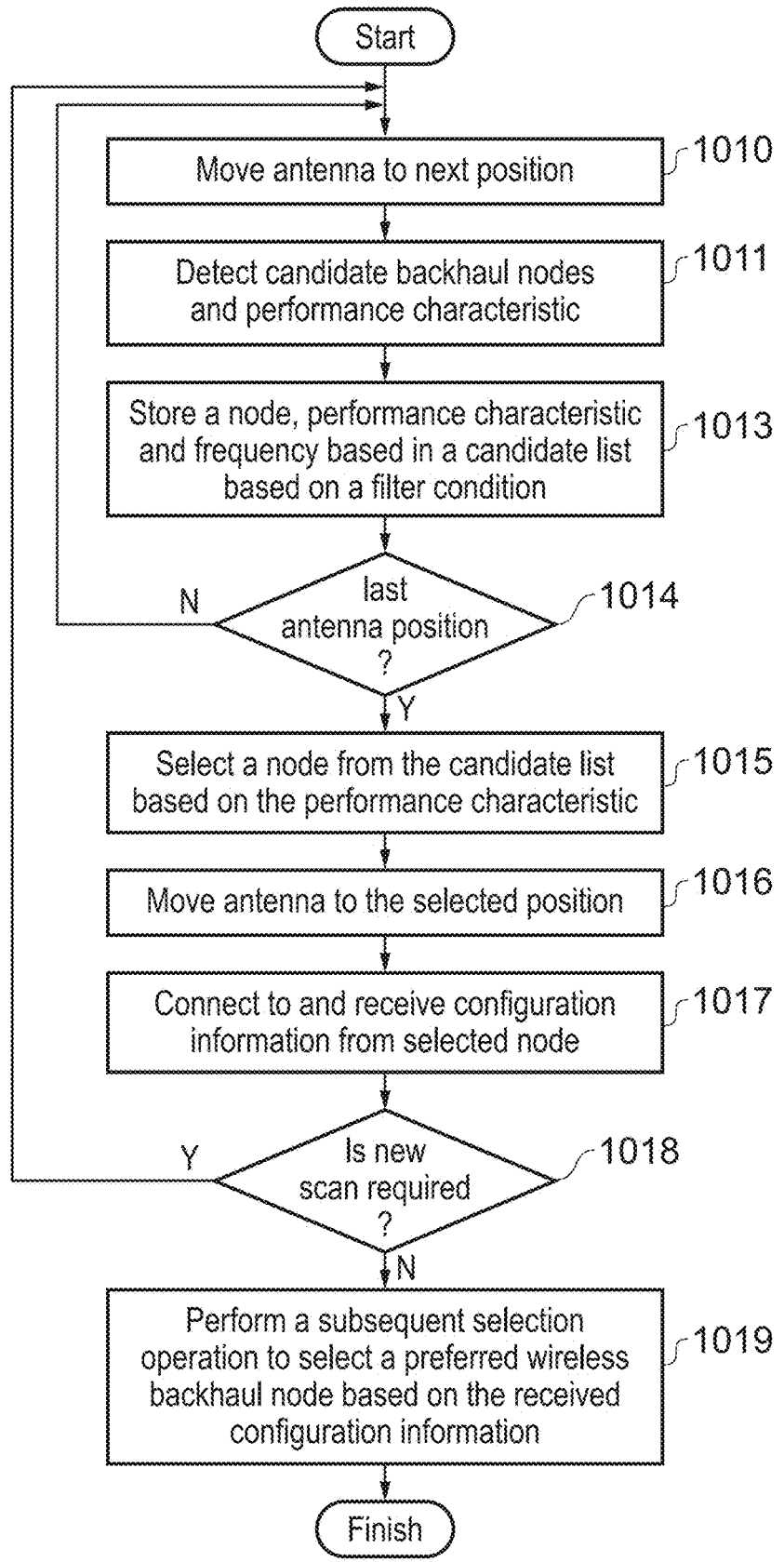
FIG. 10 is a flow diagram which illustrates the steps which may be performed in accordance with one example for selection of a donor node.

FIG. 10 illustrates, in a flow diagram, a sequence of steps taken by one example of the present technique in order to select a best wireless backhaul node to use as a donor node for a UER in a wireless network. As illustrated in step 1010, the antenna is moved to a next position. At step 1011, a wireless backhaul node is detected and a performance characteristic is detected which corresponds to that wireless backhaul node. This process, which is referred to as the scanning operation, is performed for each of a plurality of antenna positions, as illustrated by step 1014. Next, in step 1013 a node (or a reference to a node, such as the detected DeNB) is stored along with a performance characteristic and the frequency band in a candidate list. This storage operation is performed in dependence on a condition (filter condition) which may be determined according to the LTE 3GPP Standard or another Standard. In some cases, a plurality of nodes may be detected in step 1011. Hence it will be appreciated that a plurality of nodes may be stored in step 1013 in addition to each of their corresponding performance characteristic and frequency band. In step 1014, the UER determines whether step 1011 has been performed for all of the antenna positions. These antenna positions may not be every possible position of the antenna, but may be, for example, each of a plurality of predefined antenna angles to be used during the scanning operation. They may be defined with reference to a predetermined interval, such as every 5 degrees.

A selected wireless backhaul node is selected from among a list of candidate wireless backhaul nodes in the candidate list in step 1015 and the performance characteristic of each wireless backhaul node is used to make the selection. In step 1016, the antenna is moved to the selected position. In step 1017, the UER connects to the selected wireless backhaul node and receives configuration information. This configuration information may be received by connection circuitry 203 and is received from the EMS (Element Management System) via the selected wireless backhaul node. The connection may be performed by forming a communication link with the selected wireless backhaul node prior to the reception of the configuration information. In some examples, an additional scan may be required to be performed as specified in the configuration information as shown in step 1018. For example, if a new band is added or the priority order of the bands is changed. If this is the case, the process repeats at step 1011. Otherwise, the process continues to step 1019.

As illustrated in step 1019, a subsequent selection is performed to select a preferred wireless backhaul node from the candidate list based on the received configuration information. In step 1019, the subsequent selection may be performed by selecting the preferred wireless backhaul node from a modified candidate list since in some examples of the present technique, the configuration information will be used in combination with the candidate list to produce a modified candidate list as described above. The configuration information received from the selected wireless backhaul node enables the user and the operator of the network to have an improved ability to configure the wireless network. In particular, by specifying configuration information, the selected of the preferred wireless backhaul node in step 1019 can be controlled by the operator and therefore improves configurability.

Figure 11:
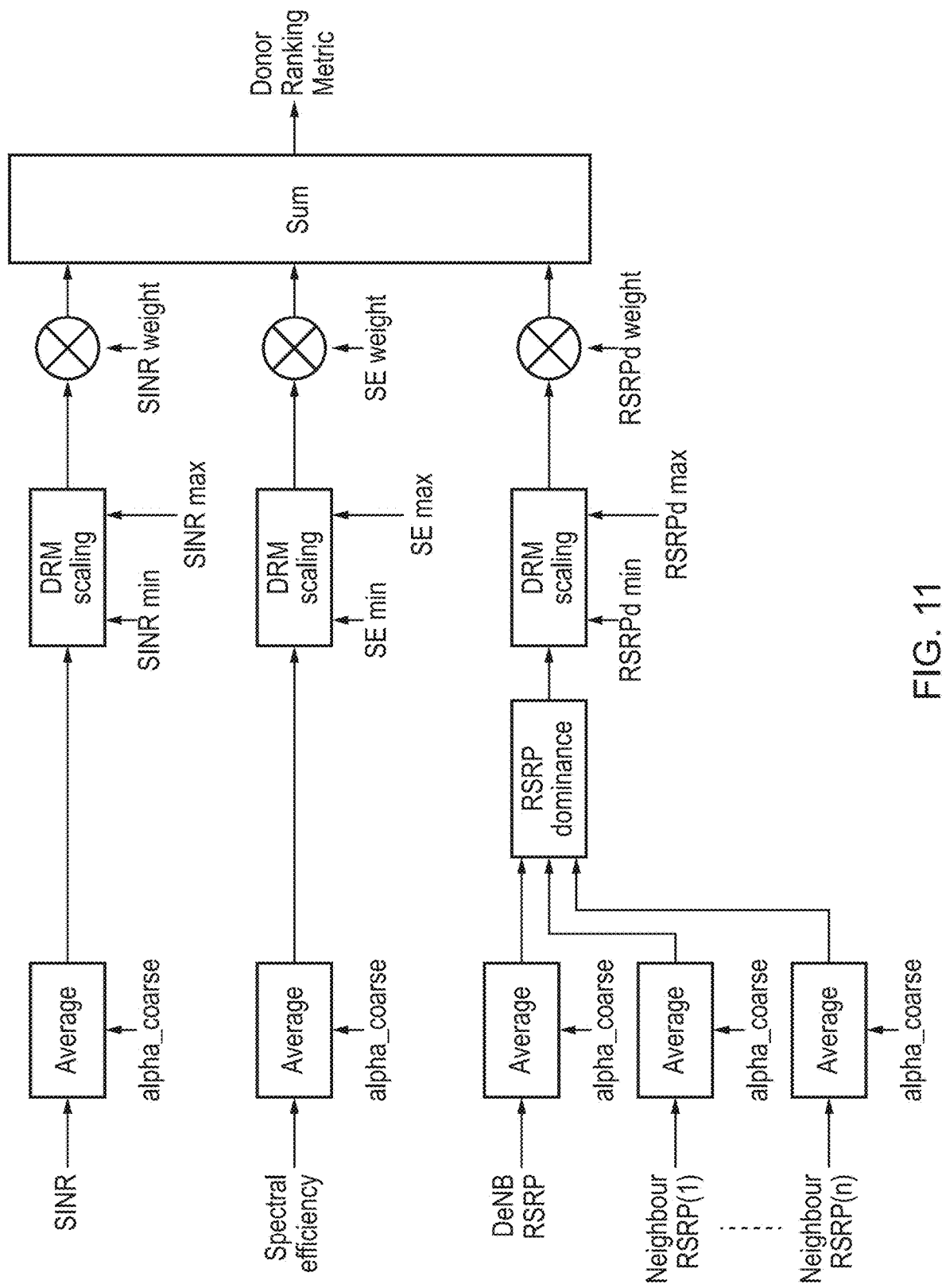
FIG. 11 shows a data flow in respect of calculating a donor ranking metric in accordance with some embodiments.

FIG. 11 shows a data flow in respect of calculating DRM (donor ranking metric). This is made up from three components in this embodiment. The first component first considers RSRP dominance, which is again made up from the RSRP value averaged over a period of time, as well as the RSRP values of neighbours of that node, again averaged over a period of time. The averaging period for coarse alignment (represented by alpha_coarse) is different compared to the averaging period for fine alignment. An example value for alpha_coarse is 0.2421 assuming a 75% settling level, an averaging duration of five seconds and a one second sampling duration. Having calculated the dominance value, this is normalised/scaled based on minimum and maximum values of RSRP dominance and then weighted. Similarly, spectral efficiency and SINR are both averaged over a period of time (represented by alpha_coarse) and normalised/scaled based on minimum and maximum values of spectral efficiency/SINR respectively. These values are then each weighted. The weighted, normalised values of SINR, Spectral Efficiency, and RSRP dominance are then added together to form DRM. Note that in some embodiments, only one of Spectral Efficiency or SINR is considered.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A node configured to operate in a wireless network, comprising:
    scan circuitry configured to perform, for each of a plurality of antenna positions, a scanning operation to detect one or more wireless backhaul nodes and a performance characteristic associated with each of the one or more wireless backhaul nodes;
    filter circuitry configured, in dependence on a condition, to store in a candidate list: a reference to one of the one or more wireless backhaul nodes, a value of the performance characteristic associated with the one of the one or more wireless backhaul nodes, and an antenna position during the scanning operation; and
    data processing circuitry configured to select a selected wireless backhaul node from the candidate list based on the performance characteristic.

2. The node of claim 1, further comprising:
    connection circuitry configured to receive configuration information from the selected wireless backhaul node, wherein the data processing circuitry is further configured to subsequently select a preferred wireless backhaul node from the candidate list based on the received configuration information.

3. The node of claim 1, wherein the scan circuitry is further configured to perform the scanning operation for each combination of the following plurality of factors: the plurality of antenna positions and at least one frequency band.

4. The node of claim 3, wherein the plurality of factors also includes at least one sub-band.

5. The node of claim 4, wherein the plurality of antenna positions is altered least frequently during successive iterations of the scanning operation.

6. The node of claim 4, wherein the at least one frequency band is altered least frequently during successive iterations of the scanning operation.

7. The node of claim 2, wherein the data processing circuitry is configured to subsequently select in dependence on the result of an ordering operation performed on the candidate list; and the ordering operation is based on the received configuration information.

8. The node of claim 7, wherein the ordering operation is additionally based on the performance characteristic.

9. The node of claim 1, wherein the selected wireless backhaul node is configured to operate as a donor node for the node in the wireless network.

10. The node of claim 1, wherein the performance characteristic is a link quality metric indicative of a quality of a link between the wireless backhaul node and the node.

11. The node of claim 10, wherein the link quality metric is determined based on at least one of: the frequency band of the wireless backhaul node, the signal to interference noise ratio and the spectral efficiency of the wireless backhaul node.

12. The node of claim 1, further comprising:
an antenna,
wherein the antenna position comprises a rotation of the antenna.

13. The node of claim 1, further comprising:
an antenna,
wherein the antenna position comprises a location of the antenna.

14. The node of claim 12, wherein the antenna is operable to be rotated through an angle of at least 360 degrees.

15. The node of claim 2, wherein the configuration information specifies at least one connection criterion for at least one of the one or more wireless backhaul nodes, and the data processing circuitry is configured to subsequently select the preferred wireless backhaul node in dependence on the at least one connection criterion.

16. The node of claim 1, the scan circuitry is configured to set an antenna position based on an antenna position stored in the candidate list.

17. The node of claim 1, wherein the selected wireless backhaul node is the wireless backhaul node with a best value of the performance characteristic provided in the candidate list.

18. The node of claim 1, wherein the data processing circuitry is further configured to selectively restrict access to the one or more wireless backhaul nodes based on restriction information contained within the configuration information.

19. The node of claim 18, wherein the restriction information specifies a subset of wireless backhaul links which do have restricted access.

20. The node of claim 1, wherein the condition is determined by the 3GPP standard and is used to determine which of the one or more wireless backhaul nodes are suitable for connection as donor nodes.

21. The node of claim 2, wherein the configuration information is a preferred donor cell list.

22. A method for operating a node in a wireless network, comprising the steps of:

scanning, for each of a plurality of antenna positions, to detect one or more wireless backhaul nodes and a performance characteristic associated with each of the one or more wireless backhaul nodes;

in dependence on a condition, storing in a candidate list: a reference to one of the one or more wireless backhaul nodes, a value of the performance characteristic associated with the one of the one or more wireless backhaul nodes, and an antenna position during the scanning operation; and selecting a selected wireless backhaul node from the candidate list based on the performance characteristic.

23. A node configured to operate in a wireless network, comprising:

means for performing, for each of a plurality of antenna positions, a scanning operation to detect one or more wireless backhaul nodes and a performance characteristic associated with each of the one or more wireless backhaul nodes;

means for storing, in dependence on a condition, in a candidate list: a reference to one of the one or more wireless backhaul nodes, a value of the performance characteristic associated with the one of the one or more wireless backhaul nodes, and an antenna position during the scanning operation; and means for selecting a selected wireless backhaul node from the candidate list based on the performance characteristic.

* * * * *